(12) United States Patent
Eckols

(10) Patent No.: US 10,704,695 B2
(45) Date of Patent: Jul. 7, 2020

(54) DIRECTIONAL FLOW CONTROL DEVICE

(71) Applicant: THE BOEING COMPANY, Chicago, IL (US)

(72) Inventor: David Ansyl Eckols, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 59 days.

(21) Appl. No.: 15/918,314

(22) Filed: Mar. 12, 2018

(65) Prior Publication Data

US 2019/0277414 A1    Sep. 12, 2019

(51) Int. Cl.

| F16K 11/074 | (2006.01) |
|---|---|
| F16K 31/04 | (2006.01) |
| F16K 11/087 | (2006.01) |
| F16K 11/072 | (2006.01) |

(52) U.S. Cl.
CPC .......... F16K 11/074 (2013.01); F16K 11/072 (2013.01); F16K 11/0876 (2013.01); F16K 31/041 (2013.01); F16K 31/042 (2013.01); F16K 31/043 (2013.01)

(58) Field of Classification Search
CPC ............. Y10T 137/8782; F16K 11/074; F16K 11/0876; F16K 31/041; F16K 31/043
See application file for complete search history.

(56) References Cited

U.S. PATENT DOCUMENTS

| 4,223,700 | A | * | 9/1980 | Jones | B65G 53/56 |
| | | | | | 137/625.46 |
| 4,372,337 | A | * | 2/1983 | Holzenberger | F16K 11/08 |
| | | | | | 134/109 |
| 5,156,504 | A | * | 10/1992 | Stich | B23Q 1/0018 |
| | | | | | 137/625.46 |
| 6,240,946 | B1 | * | 6/2001 | Beasley | C10B 31/12 |
| | | | | | 137/15.06 |
| 8,424,842 | B2 | * | 4/2013 | Bussear | E21B 34/066 |
| | | | | | 251/250.5 |
| 8,820,356 | B2 | * | 9/2014 | Kannoo | F16K 11/074 |
| | | | | | 137/625.43 |
| 8,931,502 | B2 | * | 1/2015 | Allidieres | F16K 11/074 |
| | | | | | 137/625.11 |
| 9,732,865 | B2 | * | 8/2017 | Henke | B65G 53/56 |
| 10,161,539 | B1 | * | 12/2018 | Lin | F16K 31/041 |
| 2005/0236049 | A1 | | 10/2005 | Manson | |

FOREIGN PATENT DOCUMENTS

GB         114005 A  *  3/1918 ............ F16K 11/074

OTHER PUBLICATIONS

Extended European Search Report for EP 19161806.5-1015, dated Aug. 9, 2019.

* cited by examiner

*Primary Examiner* — Seth W. Mackay-Smith
(74) *Attorney, Agent, or Firm* — The Small Patent Law Group LLC; Jay J. Hoette

(57) ABSTRACT

A directional flow control device includes a housing extending along a longitudinal axis between an inlet end and a discharge end. A flow deflector is received in the housing. The flow deflector is rotatable in the housing about a rotation axis parallel to the longitudinal axis. The flow deflector has a flow channel therethrough having an intake bore at a front end of the flow deflector and a discharge bore at a rear end of the flow deflector. The intake bore is coaxial with the rotation axis and the discharge bore is offset from the rotation axis.

30 Claims, 8 Drawing Sheets

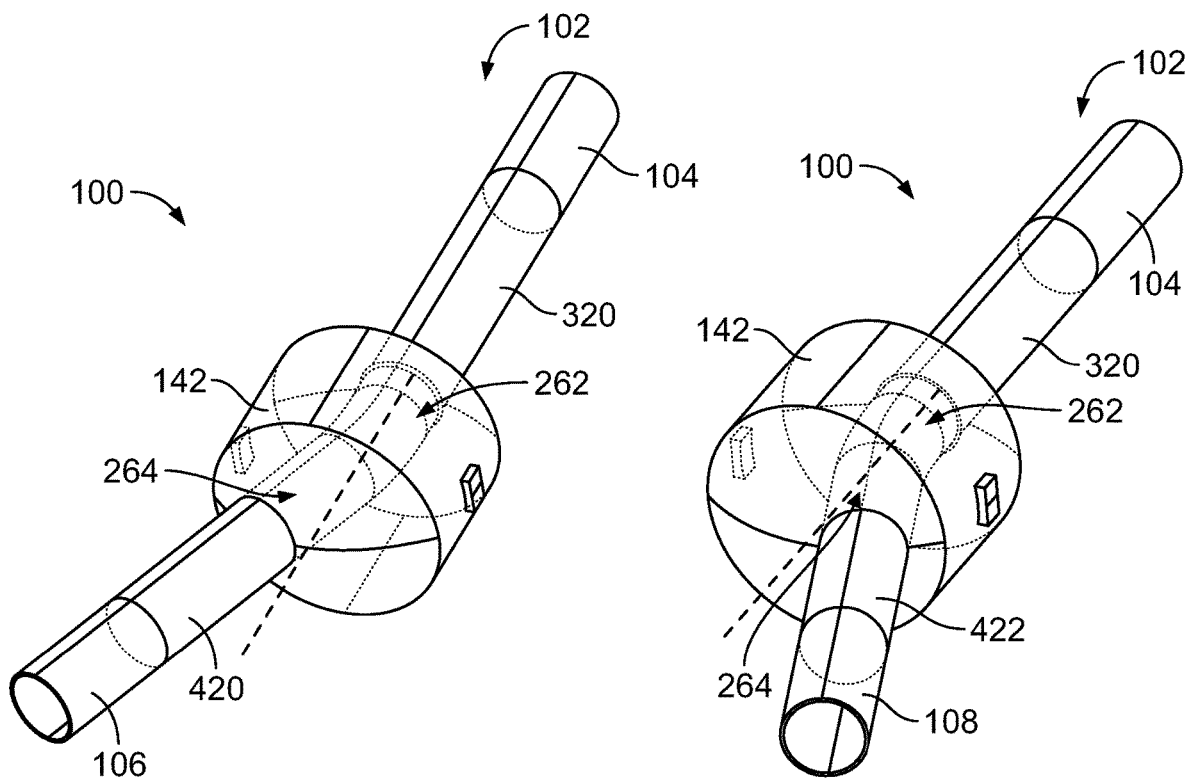
FIG. 12
FIG. 13
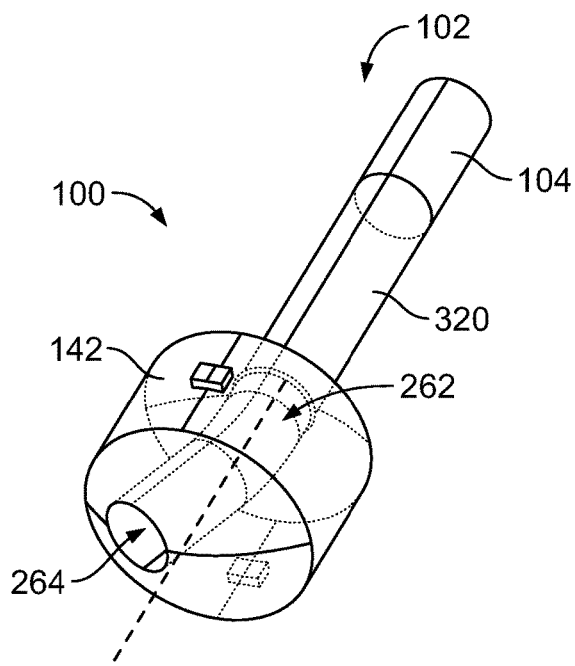
FIG. 14

DIRECTIONAL FLOW CONTROL DEVICE

BACKGROUND

The present disclosure relates generally to a directional flow control device and methods of assembling a directional flow control device.

Flow control devices are used to control fluid flow in various systems. For example, in vehicles, such as aircraft, flow control devices are used to control fuel flow or hydraulic fluid flow, such as in flight control systems. Typical flow control devices are directional valves to change flow direction, such as into different channels or pipes. Other types of flow control devices are shut off valves that are operated to either allow flow or shut off flow in the system. Some systems utilize both shut off valves and directional valves within the system. Conventional flow control devices tend to be heavy and bulky, occupy significant space in the system, such as in the aircraft, and are expensive due to manufacturing complexity.

Conventional flow control devices use a rotating bearing with channels to direct the flow within the flow control device. The rotating bearing is rotated by a motor utilizing a set of planetary gears to achieve the torque needed to rotate the bearing. The planetary gears are expensive and require maintenance and replacement. The rotating bearing of conventional flow control devices is typically rotated around an axis that is generally perpendicular to the channels allowing fluid flow therethrough. The inlet and the outlet channels of the rotating bearing of conventional flow control devices are typically angled at either a 45° angle or 90° angle relative to each other and have significant pressure loss due to the high angle of deflection of the fluid.

SUMMARY

In accordance with one example, a directional flow control device is provided including a housing extending along a longitudinal axis between an inlet end and a discharge end. A flow deflector is received in the housing. The flow deflector is rotatable in the housing about a rotation axis parallel to the longitudinal axis. The flow deflector has a flow channel therethrough having an intake bore at a front end of the flow deflector and a discharge bore at a rear end of the flow deflector. The intake bore is coaxial with the rotation axis and the discharge bore is offset from the rotation axis.

In accordance with one example, a directional flow control device is provided having a housing extending along a longitudinal axis between an inlet end and a discharge end and a flow deflector received in the housing. The flow deflector is rotatable in the housing about a rotation axis parallel to the longitudinal axis. The flow deflector has a flow channel therethrough. The flow channel has an intake bore at a front end of the flow deflector and a discharge bore at a rear end of the flow deflector. The intake bore extends along an intake bore axis and the discharge bore extends along a discharge bore axis angled relative to the intake bore axis by a fluid path change angle of less than 45°.

In accordance with one example, a method of assembling a directional flow control device is provided including providing a shell having a cavity between a front end and a rear end. The method includes positioning a front housing in the cavity having a front pocket and an inlet bore open to the front pocket and positioning a rear housing in the cavity having a rear pocket, a first outlet bore open to the rear pocket and a second outlet bore open to the rear pocket, wherein the front housing and the rear housing are aligned in the cavity along a longitudinal axis extending between an inlet end and an outlet end of the directional flow control device. The method includes providing a flow deflector having a hub with a front end and a rear end with the front end being positioned in the front pocket and the rear end being positioned in the rear pocket and with the flow deflector having a flow channel therethrough having an intake bore at a front end of the flow deflector and a discharge bore at a rear end of the flow deflector. The method includes positioning the flow deflector between the front housing and the rear housing such that the intake bore is in flow communication with the inlet bore. The hub is rotatable relative to the front housing and the rear housing about a rotation axis coaxial with the intake bore and the rotation axis being parallel to the longitudinal axis and the hub is rotated about the rotation axis between a first discharge position and a second discharge position wherein the discharge bore is configured to be in fluid communication with the first outlet bore when the hub is at the first discharge position and wherein the discharge bore is configured to be in fluid communication with the second outlet bore when the hub is at the second discharge position.

The features and functions that have been discussed can be achieved independently in various embodiments or may be combined in yet other embodiments, further details of which can be seen with reference to the following description and drawings.

BRIEF DESCRIPTION OF THE DRAWINGS

FIG. 12 is a perspective view of a portion of the directional flow control device showing the flow deflector in a first discharge position.

FIG. 13 is a perspective view of a portion of the directional flow control device showing the flow deflector in a second discharge position.

FIG. 14 is a perspective view of a portion of the directional flow control device showing the flow deflector in a shut off position.

DETAILED DESCRIPTION

Figure 1:
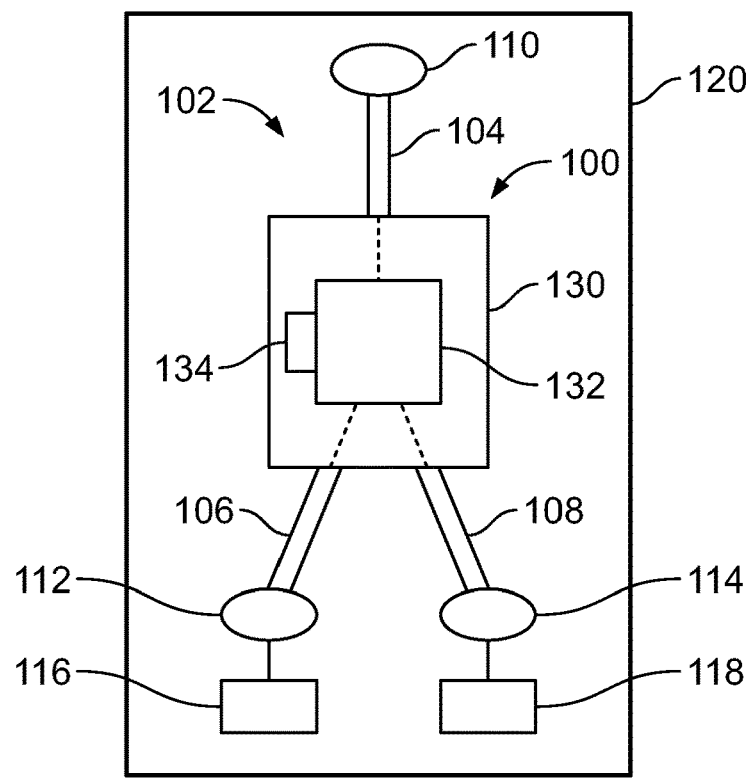
FIG. 1 is a schematic view of a directional flow control device in accordance with an exemplary embodiment.

The following detailed description of certain embodiments will be better understood when read in conjunction with the appended drawings. It should be understood that the various embodiments are not limited to the arrangements and instrumentality shown in the drawings.

FIG. 1 is a schematic view of a directional flow control device 100 in accordance with an exemplary embodiment for use in a fluid system 102. The directional flow control device 100 controls fluid flow in the fluid system 102. The fluid system 102 includes at least one supply lines and at least one discharge line coupled to the directional flow control device 100. For example, in the illustrated embodiment, the fluid system 102 includes a first supply line 104, a first discharge line 106 and a second discharge line 108. In an exemplary embodiment, the first supply line 104 is coupled to a first supply reservoir 110, the first discharge line 106 is coupled to a first discharge reservoir 112 and the second discharge line 108 is coupled to a second discharge reservoir 114. The directional flow control device 100 is used to control flow between the first supply reservoir 110 and the first and second discharge reservoirs 112, 114. For example, the directional flow control device 100 may control fluid flow therethrough from the first supply line 104 to the first discharge line 106 or the second discharge line 108. In various embodiments, the fluid system 102 may include more than one supply line 104 and/or more than one supply reservoir 110. Optionally, the directional flow control device 100 may be operable in a shut off state where the directional flow control device 100 restricts fluid flow to the first discharge line 106 and the second discharge line 108. In alternative embodiments, the flow through the directional flow control device may be reversed such that the reservoirs 112, 114 are supply reservoirs and the reservoir 110 is a discharge reservoir; however, the description of the directional flow control device herein is with reference to the supply and discharge arrangement illustrated in FIG. 1.

The first discharge reservoir 112 may be coupled to a first working component 116 and the second discharge reservoir 114 may be coupled to a second working component 118. The fluid is used by the first and second working components 116, 118 for one or more functions or operations. For example, in an exemplary embodiment, the fluid system 102 may be used in a vehicle, such as an aircraft 120. By way of example, the fluid system 102 may be a fuel supply system and the directional flow control device 100 may be used to control supply of fuel from the first supply reservoir 110 to the various first and second discharge reservoirs 112, 114. The first and second working components 116, 118 may be fuel pumps in such embodiments. By way of example, the fluid system 102 may be a flight control system, such as for controlling a position of a rudder or a flap, and the directional flow control device 100 may be used to control supply of hydraulic fluid within the fluid system 102, such as for moving the rudder or the flap. The first and second working components 116, 118 may be hydraulic actuators in such embodiments. By way of example, the fluid system 102 may be a landing gear control system, such as for controlling a position of the landing gear of the aircraft 120, and the directional flow control device 100 may be used to control supply of hydraulic fluid within the landing gear control system to raise or lower the landing gear of the aircraft 120.

The fluid system 102 may be used in other subsystems of the aircraft 120 in alternative embodiments. The fluid system 102 may be used in other types of vehicles other than aircraft in alternative embodiments. The fluid system 102 may be used in non-vehicle applications, such as industrial applications, in alternative embodiments.

In an exemplary embodiment, the directional flow control device 100 includes a shell 130, a flow assembly 132 received in the shell 130 and a driver assembly 134 received in the shell 130. The flow assembly 132 is fluidly coupled to the supply line 104 and the first and second discharge lines 106, 108. The driver assembly 134 is operably coupled to the flow assembly 132 to control operation of the flow assembly 132, such as by moving the flow assembly 132 2 different discharge positions to control flow to the first discharge line 106 or the second discharge line 108. Optionally, the driver assembly 134 may be operated to move the flow assembly 132 to a shut off position to stop flow through the fluid system 102.

Figure 2:
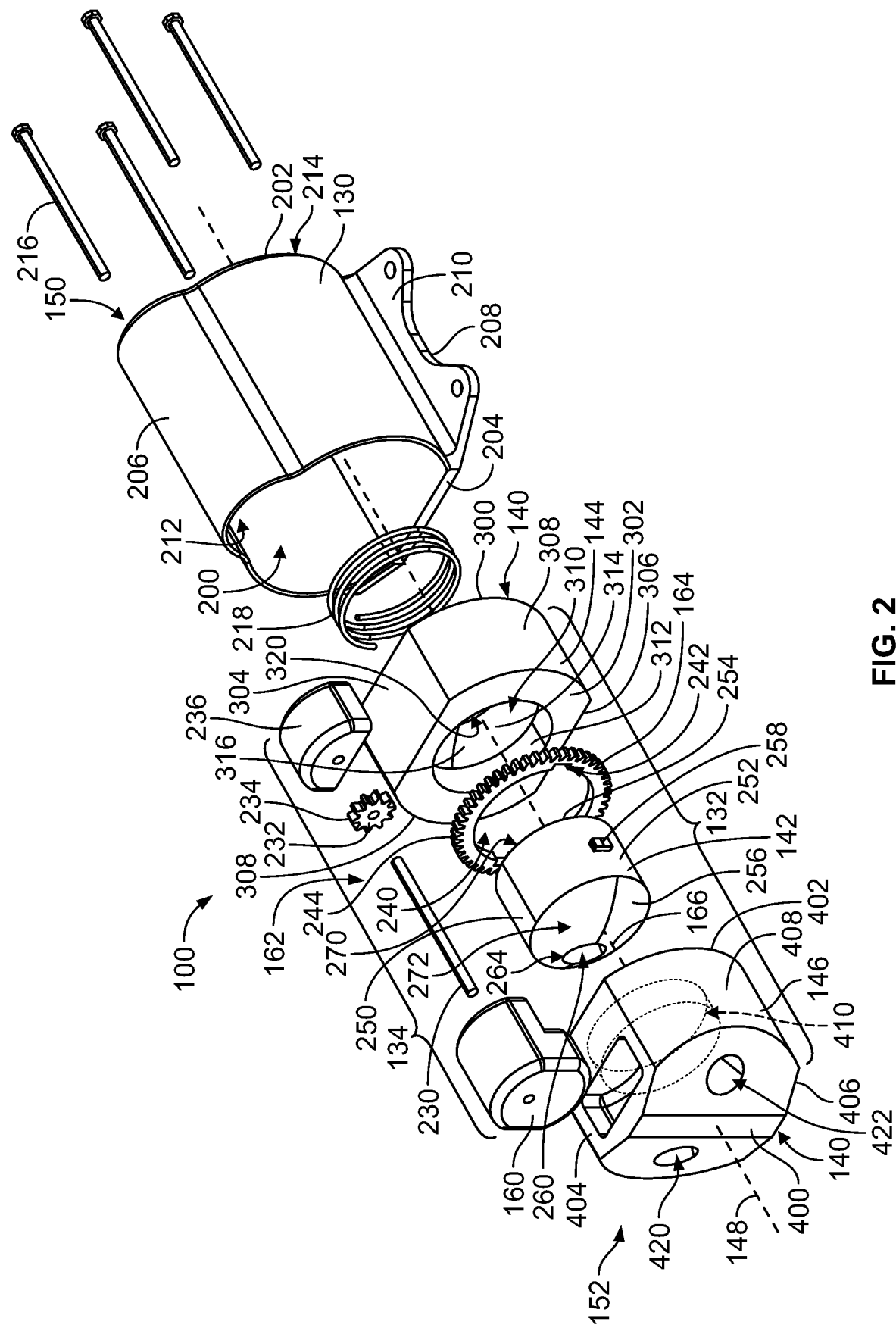
FIG. 2 is an exploded view of the directional flow control device in accordance with an exemplary embodiment.

FIG. 2 is an exploded view of the directional flow control device 100 in accordance with an exemplary embodiment. The directional flow control device 100 includes the shell 130, the flow assembly 132 and the driver assembly 134. In an exemplary embodiment, the flow assembly 132 includes a housing 140 and a flow deflector 142 received in the housing 140. In the illustrated embodiment, the housing 140 is a multi-piece housing including a front housing 144 and a rear housing 146. The flow deflector 142 is configured to be captured between the front housing 144 and the rear housing 146. The flow deflector 142, the front housing 144 and the rear housing 146 are configured to be received in the shell 130 along a longitudinal axis 148. In an exemplary embodiment, the flow deflector 142 is rotatably received within the front housing 144 and the rear housing 146 to control flow through the directional flow control device 100. The housing 140 extends between an inlet end 150 and a discharge end 152 opposite the inlet end 150. The inlet end 150 and the discharge end 152 are arranged along the longitudinal axis 148.

In an exemplary embodiment, the driver assembly 134 includes a motor 160 and an actuator 162 driven by the motor 160. The actuator 162 is used to move the flow deflector 142. In an exemplary embodiment, the driver assembly 134 includes a gear 164 coupled to the flow deflector 142. The actuator 162 engages and drives the gear 164 to rotate the flow deflector 142 about a rotation axis 166 parallel to the longitudinal axis 148.

The shell 130 includes body defining a cavity 200 extending between a front 202 and a rear 204 of the shell 130. The cavity 200 receives the flow assembly 132. The body may be manufactured from a metal material or a durable plastic material to protect the other components of the directional flow control device 100. The body may be thin to reduce weight of the directional flow control device 100. The shell 130 includes a top 206 and the bottom 208 opposite the top 206. In an exemplary embodiment, the shell 130 includes a mounting flange 210 at the bottom 208 for mounting the directional flow control device 100 to another component or structure, such as within the aircraft 120. The mounting flange 210 may be provided at other locations in alternative embodiments. In an exemplary embodiment, the cavity 200 includes a channel 212 at the top 206 that receives at least a portion of the driver assembly 134. The channel 212 may be narrower than the cavity 200 to reduce the overall size of the directional flow control device 100.

In an exemplary embodiment, the cavity 200 is open at the rear 204 to receive the components of the directional flow control device 100. Optionally, a cover (not shown) may be coupled to the shell 130 at the rear 204 to close the cavity 200, such as to hold the flow assembly 132 in the cavity 200. In an exemplary embodiment, the shell 130 includes an end wall 214 (shown in FIG. 5) at the front 202. In various embodiments, the flow assembly 132 is coupled to the end wall 214. For example, in the illustrated embodiment, the directional flow control device 100 includes fasteners 216 used to secure the flow assembly 132 to the shell 130. In an exemplary embodiment, the fasteners 216 are configured to pass through the front housing 144 and are configured to be threadably coupled to the rear housing 146. For example, the rear housing 146 is fixed to the end wall 214 of the shell 130 by the fasteners 216. The front housing 144 may be axially movable along the fasteners 216 relative to the rear housing 146 and the shell 130. For example, in an exemplary embodiment, the directional flow control device 100 includes a biasing spring 218 configured to engage the front housing 144 and the end wall 214 of the shell 130 to bias the front housing 144 toward the rear housing 146. The flow deflector 142 is captured between the front housing 144 and the rear housing 146. The biasing spring 218 sealingly compresses the front housing 144 against the flow deflector 142.

The driver assembly 134 is configured to be received in the cavity 200, such as in the channel 212. In an exemplary embodiment, the motor 160 of the driver assembly 134 is an electric motor. The actuator 162 includes a driveshaft 230 and a pinion gear 232 coupled to the driveshaft 230 and rotated by the driveshaft 230. The pinion gear 232 includes gear teeth 234 around the outer perimeter of the pinion gear 232. The pinion gear 232 is configured to engage the gear 164 to rotate the flow deflector 142. Other types of actuators 162 may be used in alternative embodiments. In an exemplary embodiment, the driver assembly 134 includes a bearing 236 for supporting the driveshaft 230. In an exemplary embodiment, the motor 160 and the bearing 236 are configured to be mounted to the driver assembly 134, such as to the rear housing 146 and the front housing 144, respectively. In other various embodiments, the motor 160 and/or the bearing 236 may be mounted to the shell 130.

The gear 164 includes an opening 240 that receives the flow deflector 142. In various embodiments, the gear 164 includes one or more locking features 242 configured to engage the flow deflector 142 and lock the gear 164 to the flow deflector 142 against relative rotation. In various embodiments, the locking feature 242 is a slot formed along the interior surface of the gear 164; however, other types of locking features may be provided in alternative embodiments. The gear 164 includes gear teeth 244 around the outer perimeter of the gear 164. The gear teeth 244 are configured to interface with the gear teeth 234 of the pinion gear 232 to drive rotation of the gear 164. In an exemplary embodiment, the gear 164 is configured to be coaxial with the flow deflector 142. The gear 164 is configured to be coaxial with the rotation axis 166 of the flow deflector 142.

The flow deflector 142 includes a cylindrical hub 250 having a cylindrical outer perimeter 252. The flow deflector 142 extends between a front end 254 and a rear end 256. In an exemplary embodiment, the flow deflector 142 includes one or more locking features 258 for locking the gear 164 to the hub 250, such as for locking to the locking features 242 of the gear 164. In various embodiments, the locking feature 258 is a protrusion or tab extending from the outer perimeter 252. Other types of locking features 258 may be provided in alternative embodiments, such as a groove or channel.

The flow deflector 142 includes a flow channel 260 extending therethrough. The flow channel 260 includes an intake bore 262 (shown in FIG. 7) and a discharge bore 264. The intake bore 262 is open at the front end 254 and the discharge bore 264 is open at the rear end 256. In an exemplary embodiment, the intake bore 262 is coaxial with the rotation axis 166 and the discharge bore 264 is offset from the rotation axis 166. For example, the discharge bore 264 is angled nonparallel to the intake bore 262.

In an exemplary embodiment, the front end 254 has a convex, curved profile defining a front sealing surface 270 configured to seal against the front housing 144. The rear end 256 has a convex, curved profile defining a rear sealing surface 272 configured to seal against the rear housing 146. In other various embodiments, the front end 254 and/or the rear end 256 may be flat rather than being curved or may have other shapes in alternative embodiments.

The front housing 144 extends along the longitudinal axis 148 between a front end 300 and an inner end 302. The inner end 302 is configured to face the rear housing 146. The front housing 144 includes a top 304 and a bottom 306 extending between the front end 300 and the inner end 302. In various embodiments, the top 304 and/or the bottom 306 may be flat for engagement with and support by the shell 130. For example, the flat surfaces may resist rotation of the rear housing 146 relative to the shell 130. The front housing 144 includes sides 308 extending between the top 304 and the bottom 306. In various embodiments, the sides 308 are curved; however, the sides 308 may have other shapes in alternative embodiments.

The front housing 144 includes a front pocket 310 configured to receive the flow deflector 142. The front pocket 310 is sized and shaped to receive the front end 254 of the flow deflector 142. In an exemplary embodiment, the front pocket 310 is defined by one or more sidewalls 312 and an end wall 314. The end wall 314 defines a front sealing surface 316 of the front pocket 310. The end wall 314 has a complementary shape to the front end 254 of the flow deflector 142. For example, the end wall 314 may have a concave, curved profile defining the front sealing surface 316. In an exemplary embodiment, the sidewall 312 is circular and allows rotation of the flow deflector 142 in the front pocket 310. The sidewall 312 supports a portion of the hub 250.

The front housing 144 includes an inlet bore 320 between the end wall 314 and the front end 300. The inlet bore 320 is configured to be in flow communication with the supply line 104 (shown in FIG. 1). In an exemplary embodiment, the inlet bore 320 is coaxial with the longitudinal axis 148. The inlet bore 320 is configured to be in flow communication with the intake bore 262 of the flow deflector 142. For example, the inlet bore 320 and the intake bore 262 are aligned along the rotation axis 166. Optionally, the inlet bore 320 may be threaded to receive the supply line 104 or a coupling on the supply line 104. Alternatively, the supply line 104 may be soldered to the inlet bore 320.

The rear housing 146 extends along the longitudinal axis 148 between a rear end 400 and an inner end 402. The inner end 402 is configured to face the front housing 144. The rear housing 146 includes a top 404 and a bottom 406 extending between the rear end 400 and the inner end 402. In various embodiments, the top 404 and/or the bottom 406 may be flat for engagement with and support by the shell 130. For example, the flat surfaces may resist rotation of the rear housing 146 relative to the shell 130. The rear housing 146 includes sides 408 extending between the top 404 and the bottom 406. In various embodiments, the sides 408 are curved; however, the sides 408 may have other shapes in alternative embodiments.

The rear housing 146 includes a rear pocket 410 (shown in phantom) configured to receive the flow deflector 142. The rear pocket 410 is sized and shaped to receive the rear end 256 of the flow deflector 142. In an exemplary embodiment, the rear pocket 410 is defined by one or more side walls and an end wall. The end wall defines a rear sealing surface 416 of the rear pocket 410. The end wall has a complementary shape to the rear end 256 of the flow deflector 142. For example, the end wall may have a concave, curved profile defining the rear sealing surface 416. In an exemplary embodiment, the sidewall is circular and allows rotation of the flow deflector 142 in the rear pocket 410. The sidewall supports a portion of the hub 250.

The rear housing 146 includes a first outlet bore 420 between the end wall and the rear end 400 and a second outlet bore 422 between the end wall and the rear end 400. The first and second outlet bores 420, 422 are configured to be in flow communication with the discharge lines 106, 108 (shown in FIG. 1), respectively. The first and second outlet bores 420, 422 are configured to be in flow communication with the discharge bore 264 of the flow deflector 142 depending on the orientation of the flow deflector 142 relative to the rear housing 146. In an exemplary embodiment, the first and second outlet bores 420, 422 are angled relative to each other. The first and second outlet bores 420, 422 are angled relative to the longitudinal axis 148. Optionally, the first and second outlet bores 420, 422 may be threaded to receive the first and second discharge lines 106, 108 or couplings on the first and second discharge lines 106, 108. Alternatively, the first and second discharge lines 106, 108 may be soldered to the first and second outlet bores 420, 422.

Figure 3:
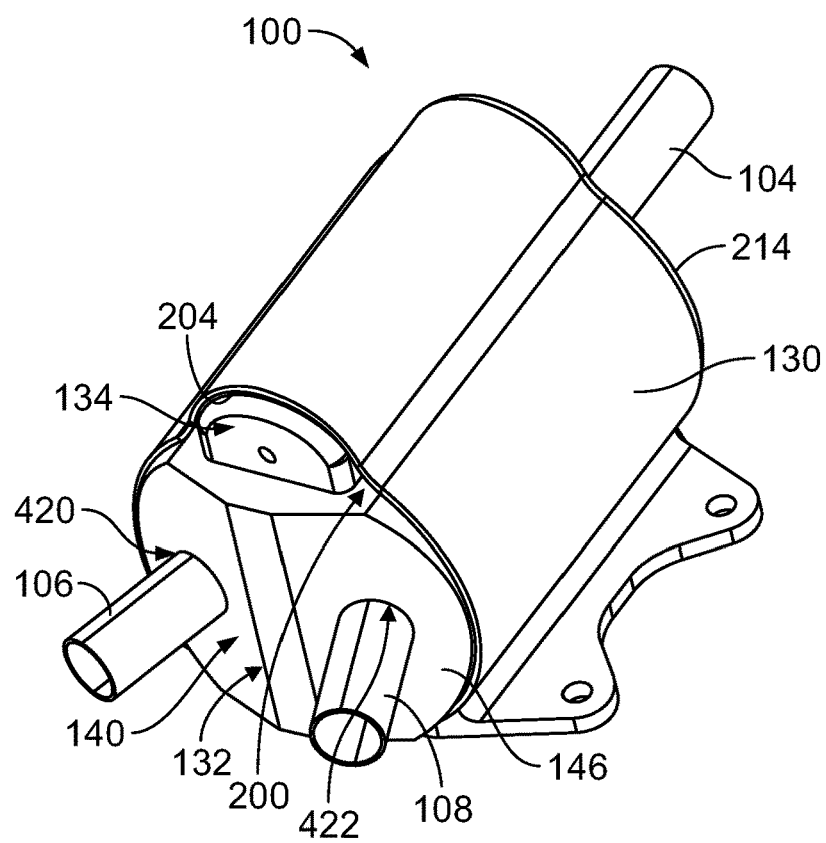
FIG. 3 is a perspective view of the directional flow control device in accordance with an exemplary embodiment.
Figure 4:
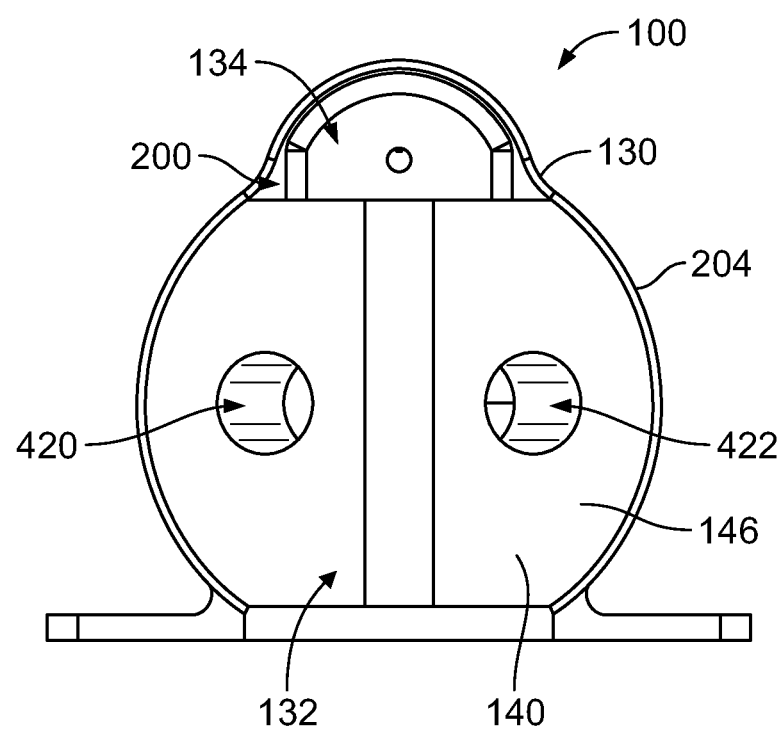
FIG. 4 is a rear view of the directional flow control device.
Figure 5:
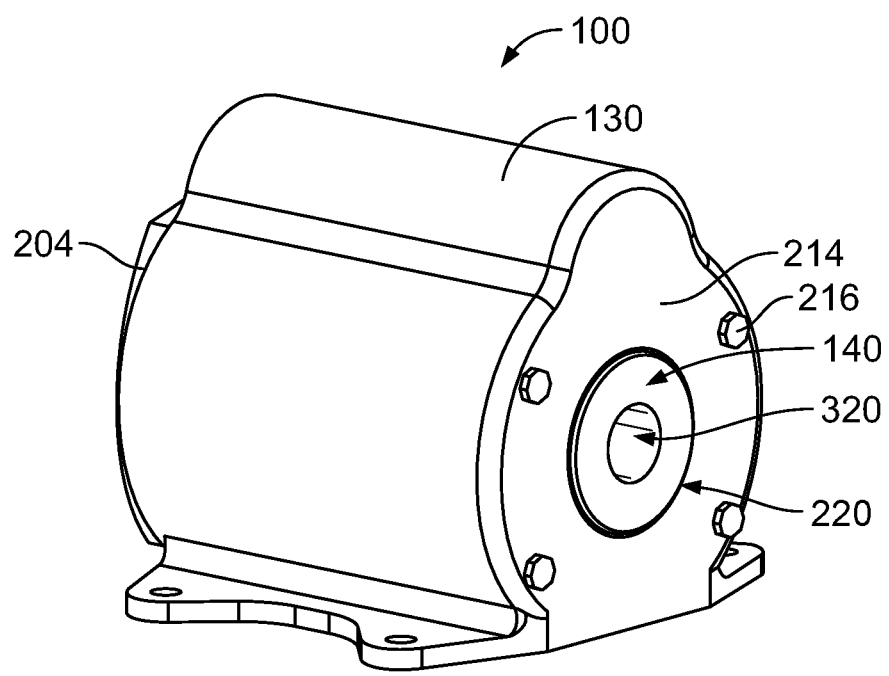
FIG. 5 is a front perspective view of the directional flow control device.

FIG. 3 is a perspective view of the directional flow control device 100 in accordance with an exemplary embodiment showing the supply line 104 coupled to the directional flow control device 100 and showing the first and second discharge lines 106, 108 coupled to the directional flow control device 100. FIG. 4 is a rear view of the directional flow control device 100. FIG. 5 is a front perspective view of the directional flow control device 100.

During assembly, the flow assembly 132 and the driver assembly 134 are loaded into the cavity 200 of the shell 130. For example, the driver assembly 134 may be mounted to the housing 140 and loaded into the cavity 200 through the rear 204. The fasteners 216 (FIG. 5) are coupled to the housing 140 to secure the housing 140 in the shell 130. In an exemplary embodiment, the shell 130 includes an opening 220 (FIG. 5) in the end wall 214 that provides access to the rear housing 146. The supply line 104 (FIG. 3) is coupled to the rear housing 146 at the inlet bore 320 (FIG. 5). The first and second discharge lines 106, 108 (FIG. 3) are coupled to the first and second outlet bores 420, 422 (FIG. 4). The directional flow control device 100 controls fluid flow from the supply line 104 to the first and second discharge lines 106, 108 through the flow assembly 132.

Figure 6:
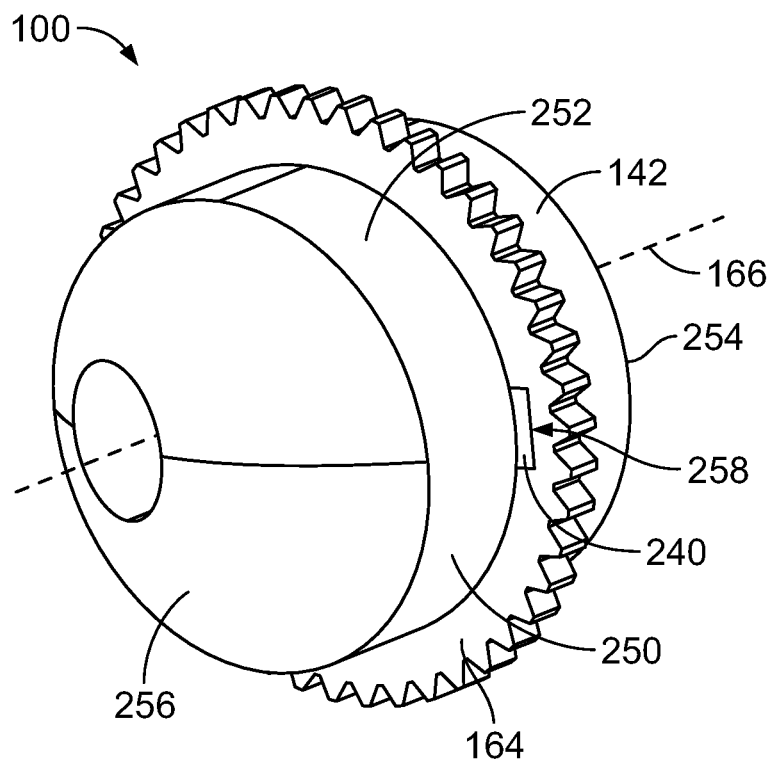
FIG. 6 is a rear perspective view of a portion of the directional flow control device showing a flow deflector and a gear in accordance with an exemplary embodiment.
Figure 7:
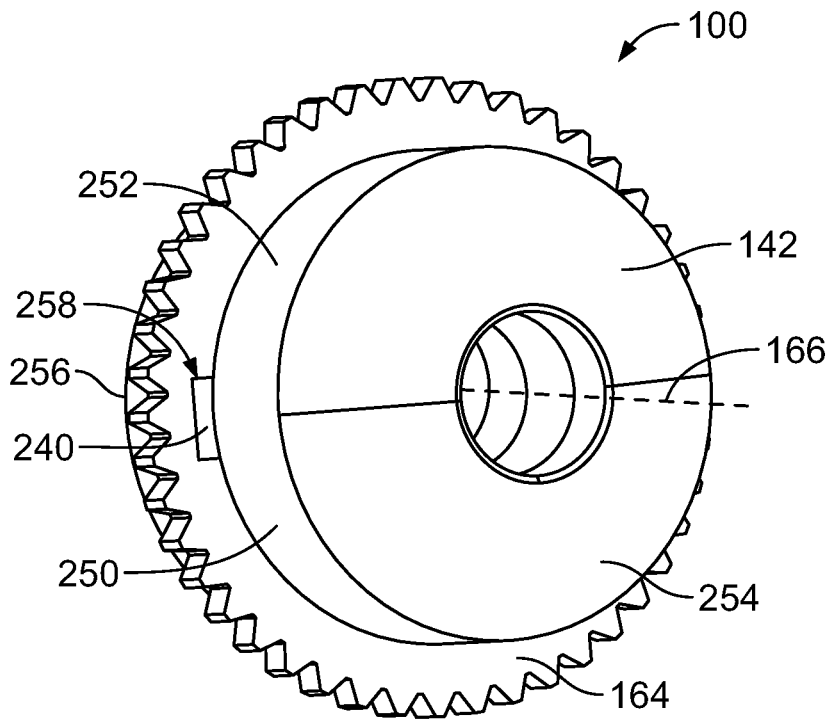
FIG. 7 is a front perspective view of a portion of the directional flow control device showing the flow deflector and the gear.

FIG. 6 is a rear perspective view of a portion of the directional flow control device 100 showing the flow deflector 142 and the gear 164 in accordance with an exemplary embodiment. FIG. 7 is a front perspective view of a portion of the directional flow control device 100 showing the flow deflector 142 and the gear 164. During assembly, the gear 164 is coupled to the flow deflector 142. For example, the hub 250 is received in the opening 240. The locking features 242 to interact with the locking features 258 to lock the gear 164 to the hub 250 against relative rotation. Rotation of the gear 164 by the driver assembly 134 (shown in FIG. 2) causes rotation of the flow deflector 142. The flow deflector 142 extends between the front end 254 and the rear end 256 along the rotation axis 166. The gear 164 is coaxial with the hub 250 along the rotation axis 166.

In an alternative embodiment, rather than having the gear 164 and the flow deflector 142 separate and discrete and coupled together, the gear 164 may be formed integral with the flow deflector 142. For example, the outer perimeter 252 of the hub 250 may have gear teeth formed thereon. For example, the gear teeth may be machined around the outer perimeter 252 or the gear teeth may be molded integral with the hub 250.

Figure 8:
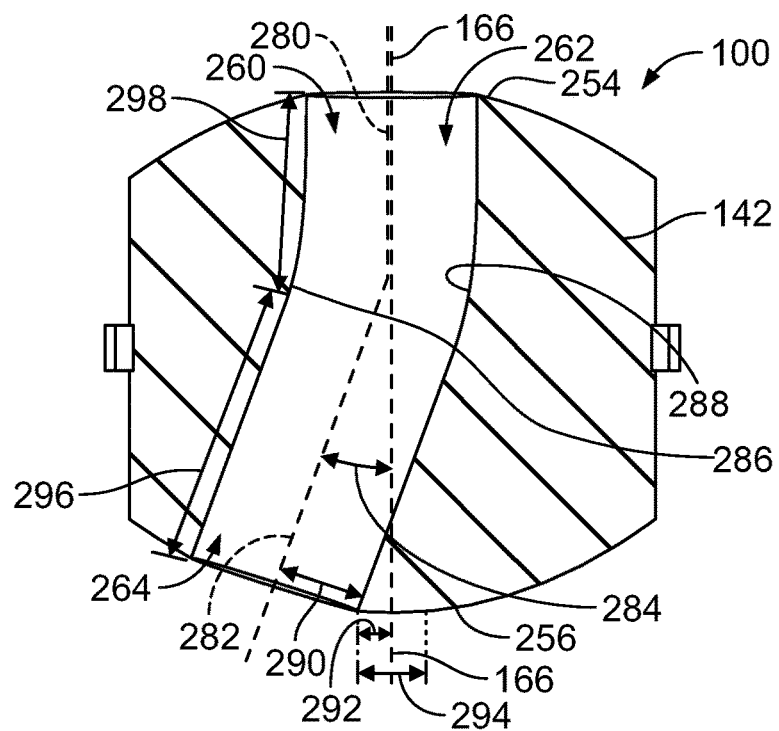
FIG. 8 is a cross-sectional view of the flow deflector in accordance with an exemplary embodiment.

FIG. 8 is a cross-sectional view of the flow deflector 142 in accordance with an exemplary embodiment. The flow channel 260 is shown extending through the flow deflector 142 in a direction generally parallel to fluid flow through the directional flow control device 100, such as between the front end 254 and the rear end 256. The intake bore 262 extends along an intake bore axis 280 and the discharge bore 264 extends along a discharge bore axis 282. The intake bore axis 280 is parallel to the rotation axis 166.

The discharge bore axis 282 is angled relative to the intake bore axis 280 and a fluid path change angle 284. In an exemplary embodiment, the fluid path change angle 284 between the discharge bore axis 282 and the intake bore axis 280 is less than 45°. In various embodiments, the fluid path change angle 284 between the discharge bore axis 282 and the intake bore axis 280 is between approximately 10° and approximately 30°. In the illustrated embodiment, the fluid path change angle 284 between the discharge bore axis 282 and the intake bore axis 280 is approximately 20°. The flow channel 260 has an inner bend 286 and an outer bend 288 between the intake bore 262 and the discharge bore 264. The inner bend 286 and the outer bend 288 are curved to provide a smooth transition between the intake bore 262 and the discharge bore 264. Providing the smooth transition and the small fluid path change angle 284 (for example, less than 45°) allows for efficient fluid flow through the flow deflector 142. For example, the smooth transition reduces the risk of cavitation at the inner bend 286 and/or the outer bend 288. Having a relatively long inner bend 286 and/or outer bend 288, rather than an abrupt corner, allows for efficient fluid flow through the flow deflector 142. The small fluid path change angle 284 has a low efficiency knock down factor for the fluid flow through the fluid system 102. The efficiency knock down factor is a knock down factor of the efficiency of the fluid path and is a function of the bend angle of the fluid path. In various embodiments, the fluid path change angle 284 may have an efficiency knock down factor of less than 0.5, such as between 0.1 and 0.5. In the illustrated embodiment, the fluid path change angle 284 has an efficiency knock down factor of less than 0.3, such as between 0.2 and 0.3. In various embodiments, the fluid path change angle 284 may have an efficiency knock down factor of less than half the efficiency knock down factor of a 45° deflection angle.

In an exemplary embodiment, the discharge bore 264 has a radius 290. The discharge bore 264, at the rear end 256, is spaced from the rotation axis 166 by a distance 292 less than the radius 290. The distance 292 corresponds to the positioning of the first and second outlet bores 420, 422 (shown in FIG. 2). When the flow deflector 142 is rotated 180°, the discharge bore 264 may be aligned with the respective first and second outlet bores 420, 422. The distance 292 corresponds to a spacing 294 between the first and second outlet bores 420, 422. For example, the spacing 294 is twice the distance 292. The spacing 294 may be selected for manufacturability of the rear housing 146 (shown in FIG. 2). Having the spacing 294 narrow corresponds to a narrow distance 292. The distance 292 corresponds to the fluid path change angle 284. For example, having a narrow distance 292 reduces the fluid path change angle 284, thus reducing the efficiency knock down factor of the flow channel 260, which affects the pressure loss through the directional flow control device 100. A length 296 of the discharge bore 264 and a length 298 of the intake bore 262 a fax the fluid path change angle 284. For example, having longer lengths 296, 298 reduces the fluid path change angle 284, thus reducing the efficiency knock down factor of the flow channel 260, which affects the pressure loss through the directional flow control device 100. However, increasing the lengths 296, 298 may add material cost and weight, which may be undesirable in some applications.

Figure 9:
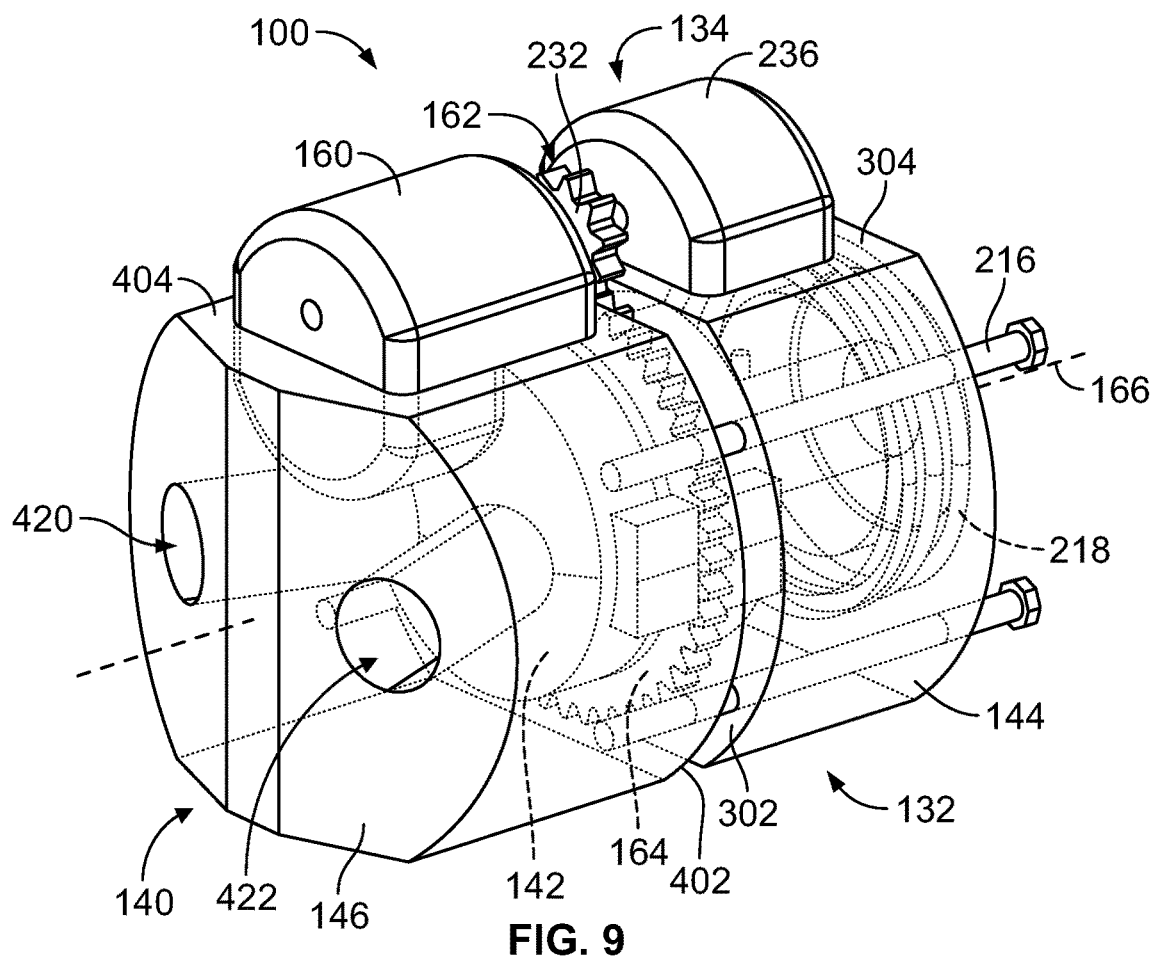
FIG. 9 is a rear perspective view of a portion of the directional flow control device in accordance with an exemplary embodiment showing a flow assembly and a driver assembly.
Figure 10:
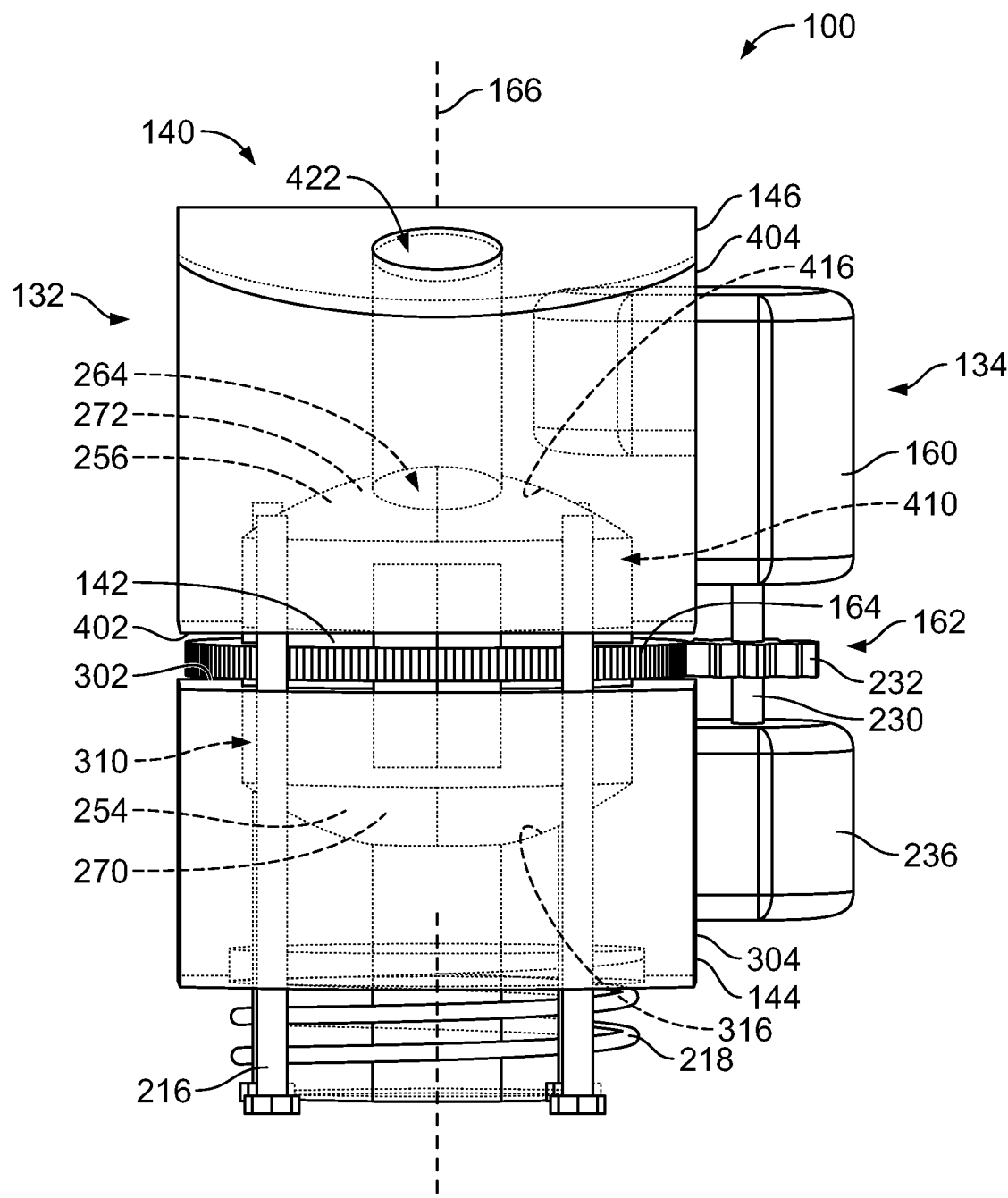
FIG. 10 is a side view of a portion of the directional flow control device in accordance with an exemplary embodiment showing the flow assembly and the driver assembly.
Figure 11:
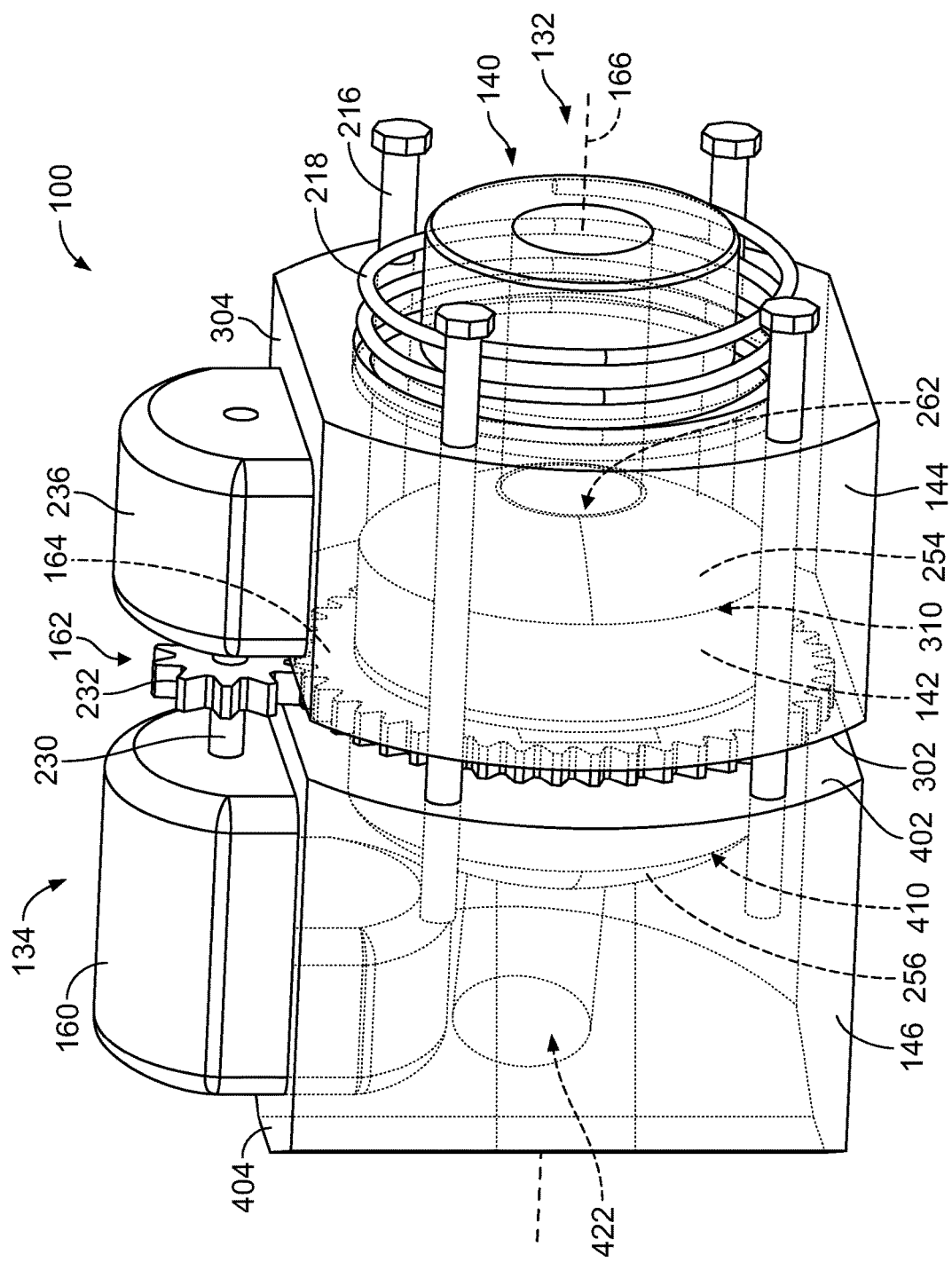
FIG. 11 is a front perspective view of a portion of the directional flow control device in accordance with an exemplary embodiment showing the flow assembly and the driver assembly.

FIG. 9 is a rear perspective view of a portion of the directional flow control device 100 in accordance with an exemplary embodiment showing the flow assembly 132 and the driver assembly 134. FIG. 10 is a side view of a portion of the directional flow control device 100 in accordance with an exemplary embodiment showing the flow assembly 132 and the driver assembly 134. FIG. 11 is a front perspective view of a portion of the directional flow control device 100 in accordance with an exemplary embodiment showing the flow assembly 132 and the driver assembly 134. The shell 130 (shown in FIG. 2) is removed for clarity to illustrate the flow assembly 132 and the driver assembly 134.

When assembled, the flow deflector 142 (shown in phantom) is received in the gear 164. The flow deflector 142 and the gear 164 are received in the housing 140. For example, the front end 254 of the flow deflector 142 is received in the front pocket 310 of the front housing 144 and the rear end 256 of the flow deflector 142 is received in the rear pocket 410 of the rear housing 146. The gear 164 is positioned between the inner ends 302, 402 of the front housing 144 and the rear housing 146. The fasteners 216 are used to secure the housing 140 to the shell 130. For example, the fasteners 216 pass through the front housing 144 and are coupled to the rear housing 146. In an exemplary embodiment, the front housing 144 is slidable along the fasteners 216 relative to the rear housing 146 and the shell 130. For example, the biasing spring 218 is used to bias the front housing 144 rearward toward the rear housing 146. The biasing spring 218 presses the front housing 144 against the flow deflector 142 and presses the flow deflector 142 against the rear housing 146. For example, the biasing spring 218 presses the front sealing surface 316 against the front sealing surface 270 of the flow deflector 142 to press the front end 254 in sealing engagement with the front sealing surface 316. The pressure from the biasing spring 218 and the front housing 144 on the flow deflector 142 presses the flow deflector 142 rearward against the rear housing 146. The rear sealing surface 272 of the flow deflector 142 is biased against the rear sealing surface 416 of the rear housing 146 by the biasing spring 218 pressing against the front housing 144 to press the rear end 256 in sealing engagement with the rear sealing surface 416. The spring constant of the biasing spring 218 is sufficient to overcome the fluid pressure plus a factor of safety, such as when the valve is at a shutoff position, to avoid a possible leak in the directional flow control device 100.

In an exemplary embodiment, the driver assembly 134 is mounted to the flow assembly 132. The bearing 236 is mounted to the top 304 of the front housing 144. The motor 160 is mounted to the top 404 of the rear housing 146. The driveshaft 230 extends between the bearing 236 and the motor 160. The pinion gear 232 is mounted on the driveshaft 230 and is operably coupled to the gear 164. Rotation of the actuator 162 by the motor 160 causes rotation of the flow deflector 142 about the rotation axis 166.

The intake bore 262 is axially aligned with the inlet bore 320 of the front housing 144 along the rotation axis 166. Rotation of the flow deflector 142 does not change the relative position of the intake bore 262 with respect to the inlet bore 320. The discharge bore 264 is angled relative to the intake bore 262 and is offset from the rotation axis 166. In an exemplary embodiment, the flow deflector 142 is rotatable relative to the front housing 144 and the rear housing 146 between a first discharge position and a second discharge position. The flow deflector 142 is rotatable to selectively couple the discharge bore 264 and flow communication with the first outlet bore 420 of the rear housing 146 and to selectively couple the discharge bore 264 and flow communication with the second outlet bore 422 of the rear housing 146 based on the position of the flow deflector 142 relative to the rear housing 146. In the first discharge position, the discharge bore 264 is aligned with and in flow communication with the first outlet bore 420 of the rear housing 146. In the second discharge position, the discharge bore 264 is aligned with and in flow communication with the second outlet bore 422 of the rear housing 146. In an exemplary embodiment, the first and second outlet bores 420, 422 are angled relative to each other, such as at an angle of less than 45°. In an exemplary embodiment, the flow deflector 142 is rotated 180° between the first discharge position and the second discharge position. The flow deflector 142 may be rotated other angles of rotation in alternative embodiments. Optionally, the flow deflector 142 may be rotated to a shut off position in which the discharge bore 264 is in flow communication with neither the first outlet bore 420 nor the second outlet bore 422 to stop flow through the directional flow control device 100. For example, the flow deflector 142 may be rotated 90° from the first discharge position and/or from the second discharge position to the shut off position.

Position of the flow deflector 142 may be controlled by the motor 160 and/or by a position control device (not shown). For example, the motor 160 may have built-in position control. For example, the motor 160 may be calibrated to control the position of the flow deflector 142 based on a position of the motor 160 and/or the driveshaft 230 and/or the pinion gear 232. In other embodiments, a separate position control device, such as a laser target device may provide real-time feedback to the motor 160 to control the position of the flow deflector 142. The laser target device may target the gear 164 and/or the flow deflector 142 and/or the pinion gear 232 and/or the driveshaft 230.

FIG. 12 is a perspective view of a portion of the directional flow control device 100 showing the flow deflector 142 in a first discharge position. FIG. 13 is a perspective view of a portion of the directional flow control device 100 showing the flow deflector 142 in a second discharge position. FIG. 14 is a perspective view of a portion of the directional flow control device 100 showing the flow deflector 142 in a shut off position.

In the first discharge position (FIG. 12), the intake bore 262 is aligned with and in flow communication with the inlet bore 320 of the front housing 144. The discharge bore 264 is aligned with and in flow communication with the first outlet bore 420 of the rear housing 146. Fluid is able to flow through the fluid system 102 from the supply line 104, through the inlet bore 320, through the intake bore 262, through the discharge bore 264, through the first outlet bore 420 into the first discharge line 106.

In the second discharge position (FIG. 13), the intake bore 262 is aligned with and in flow communication with the inlet bore 320 of the front housing 144. The discharge bore 264 is aligned with and in flow communication with the second outlet bore 422 of the rear housing 146. Fluid is able to flow through the fluid system 102 from the supply line 104, through the inlet bore 320, through the intake bore 262, through the discharge bore 264, through the second outlet bore 422 into the second discharge line 108.

In the shut off position (FIG. 14), the intake bore 262 is aligned with and in flow communication with the inlet bore 320 of the front housing 144. The discharge bore 264 is offset from the first outlet bore 420 and from the second outlet bore 422 of the rear housing 146. The flow deflector 142 is rotated to the shut off position to stop flow through the directional flow control device 100.

As used herein, an element or step recited in the singular and proceeded with the word "a" or "an" should be understood as not excluding plural of said elements or steps, unless such exclusion is explicitly stated. Furthermore, references to an "embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A directional flow control device comprising:
   a housing extending along a longitudinal axis between an inlet end and a discharge end, the housing having a front housing at the inlet end and a rear housing at the discharge end;
   a flow deflector received in the housing and positioned between the front housing and the rear housing, the flow deflector being rotatable in the housing about a rotation axis parallel to the longitudinal axis, the flow deflector having a flow channel therethrough, the flow channel having an intake bore at a front end of the flow deflector and a discharge bore at a rear end of the flow deflector, the intake bore being coaxial with the rotation axis, the discharge bore being offset from the rotation axis; and
   a shell including a cavity receiving the housing, the rear housing being fixedly coupled to the shell, wherein the front housing is axially movable in the cavity relative to the rear housing and the shell.

2. The directional flow control device of claim 1, wherein the rotation axis extends through the flow deflector in a direction generally parallel to fluid flow through the directional flow control device.

3. The directional flow control device of claim 1, wherein the discharge bore is rotatable between a first discharge position and a second discharge position.

4. The directional flow control device of claim 1, wherein the intake bore extends along an intake bore axis and the discharge bore extends along a discharge bore axis angled relative to the intake bore axis by a fluid path change angle of between 10° and 45°, wherein fluid flows into the flow deflector through the intake bore along the intake bore axis and fluid flows from the flow deflector through the discharge bore along the discharge bore axis.

5. The directional flow control device of claim 1, wherein the discharge bore has a radius, the discharge bore, at the rear end, being spaced from the rotation axis by a distance less than the radius.

6. The directional flow control device of claim 1, wherein the flow deflector includes a hub, the hub being cylindrical.

7. The directional flow control device of claim 6, further comprising a gear coaxial with the hub, the gear being driven by an actuator of a driver assembly to rotate the discharge bore.

8. The directional flow control device of claim 7, wherein the gear includes an opening receiving the hub, the gear having a locking feature, the hub having a locking feature engaging the locking feature of the gear to lock the gear to the hub against relative rotation.

9. The directional flow control device of claim 1, wherein the front end of the flow deflector has a convex, curved profile defining a front sealing surface configured to seal against the front housing, the rear end having a convex, curved profile defining a rear sealing surface configured to seal against the rear housing.

10. The directional flow control device of claim 1, wherein the front housing comprises a front pocket receiving the front end of the flow deflector and an inlet bore in flow communication with the intake bore, the rear housing having a rear pocket receiving the rear end of the flow deflector, the rear housing having a first outlet bore and a second outlet bore, the flow deflector being rotatable to selectively couple the discharge bore in flow communication with the first outlet bore and being rotatable to selectively couple the discharge bore in flow communication with the second outlet bore.

11. The directional flow control device of claim 10, wherein the flow deflector is rotatable to a first discharge position in flow communication with the first outlet bore, the flow deflector being rotatable to a second discharge position in flow communication with the second outlet bore, and the flow deflector being rotatable to a shut off position in which the discharge bore is in flow communication with neither the first outlet bore nor the second outlet bore to stop flow through the directional flow control device.

12. The directional flow control device of claim 10, wherein the inlet bore is axially aligned with the intake bore along the rotation axis.

13. The directional flow control device of claim 10, wherein the first and second outlet bores are angled relative to each other between 0° and 45°.

14. The directional flow control device of claim 10, wherein the front housing includes a front sealing surface in the front pocket and the rear housing includes a rear sealing surface in the rear pocket, the front end being in sealing engagement with the front sealing surface, and the rear end being in sealing engagement with the rear sealing surface.

15. The directional flow control device of claim 14, further comprising a biasing spring holding the front and rear ends in sealing engagement with the front and rear sealing surfaces, respectively.

16. The directional flow control device of claim 1, wherein the shell receives a driver assembly operably coupled to the flow deflector to rotate the flow deflector.

17. A directional flow control device comprising:
a housing extending along a longitudinal axis between an inlet end and a discharge end, the housing having a front housing at the inlet end and a rear housing at the discharge end, the front housing having an inlet bore along the longitudinal axis, the rear housing having a first outlet bore and a second outlet bore, the first outlet bore extending along a first outlet bore axis and the second outlet bore extending along a second outlet bore axis non-parallel to the first outlet bore axis; and
a flow deflector received in the housing and positioned between the front housing and the rear housing, the flow deflector having a flow channel therethrough, the flow channel having an intake bore at a front end of the flow deflector and a discharge bore at a rear end of the flow deflector, the intake bore extending along an intake bore axis, the discharge bore extending along a discharge bore axis angled relative to the intake bore axis by a fluid path change angle of between 10° and 45°, wherein fluid flows into the flow deflector through the intake bore along the intake bore axis and fluid flows from the flow deflector through the discharge bore along the discharge bore axis; and
a shell, the shell including a cavity receiving the housing, the rear housing being fixedly coupled to the shell, the front housing being axially movable in the cavity relative to the rear housing and the shell, the flow deflector being positioned between the front housing and the rear housing.

18. The directional flow control device of claim 17, wherein the flow deflector is rotatable in the housing about a rotation axis extending through the flow deflector in a direction generally parallel to fluid flow through the directional flow control device.

19. The directional flow control device of claim 17, wherein the flow deflector includes a cylindrical hub and a gear coaxial with the hub, the gear being driven by an actuator of a driver assembly to rotate the discharge bore, the front end of the flow deflector having a convex, curved profile defining a front sealing surface configured to seal against the front housing, the rear end having a convex, curved profile defining a rear sealing surface configured to seal against the rear housing.

20. The directional flow control device of claim 17, wherein the front housing comprises a front pocket receiving the front end of the flow deflector, the inlet bore being in flow communication with the intake bore, the rear housing having a rear pocket receiving the rear end of the flow deflector, the flow deflector being rotatable to selectively couple the discharge bore in flow communication with the first outlet bore and being rotatable to selectively couple the discharge bore in flow communication with the second outlet bore.

21. The directional flow control device of claim 20, wherein the flow deflector is rotatable to a first discharge position in flow communication with the first outlet bore, the flow deflector being rotatable to a second discharge position in flow communication with the second outlet bore, and the flow deflector being rotatable to a shut off position in which the discharge bore is in flow communication with neither the first outlet bore nor the second outlet bore to stop flow through the directional flow control device.

22. The directional flow control device of claim 17,
wherein the shell further receives a driver assembly operably coupled to the flow deflector to rotate the flow deflector.

23. The directional flow control device of claim 17, wherein the intake bore axis is aligned with and parallel to the longitudinal axis, the discharge bore axis is configured to be aligned with and parallel to the first outlet bore axis when the flow deflector is in a first discharge position, the discharge bore axis is configured to be aligned with and parallel to the second outlet bore axis when the flow deflector is in a second discharge position.

24. The directional flow control device of claim 17, wherein a fluid path through the directional flow control device has a single flow direction change located in the flow channel at an intersection between the intake bore and the discharge bore.

25. A method of assembling a directional flow control device comprising:
providing a shell having a cavity between a front end and a rear end;
positioning a front housing in the cavity by movably coupling the front housing relative to the front end of the shell, the front housing having a front pocket and an inlet bore open to the front pocket;
positioning a rear housing in the cavity, the rear housing having a rear pocket, a first outlet bore open to the rear pocket and a second outlet bore open to the rear pocket, wherein the front housing and the rear housing are aligned in the cavity along a longitudinal axis extending between an inlet end and an outlet end of the directional flow control device, wherein the first outlet bore is at a first angle relative to the longitudinal axis and the second outlet bore is at a second angle relative to the longitudinal axis;
providing a flow deflector having a hub with a front end and a rear end, the front end being positioned in the front pocket, the rear end being positioned in the rear pocket, the flow deflector having a flow channel therethrough, the flow channel having an intake bore at a front end of the flow deflector, the flow channel having a discharge bore at a rear end of the flow deflector, the flow channel at the discharge bore being angled non-parallel to the flow channel at the intake bore; and
positioning the flow deflector between the front housing and the rear housing such that the intake bore is in flow communication with the inlet bore, the hub being rotatable relative to the front housing and the rear housing about a rotation axis coaxial with the intake bore and the rotation axis being parallel to the longitudinal axis, the hub being rotated about the rotation axis between a first discharge position and a second discharge position wherein the discharge bore is configured to be in fluid communication with the first outlet bore when the hub is at the first discharge position and wherein the discharge bore is configured to be in fluid communication with the second outlet bore when the hub is at the second discharge position wherein said positioning of the front housing in the cavity further comprises positioning the front housing between the front end of the shell and the flow deflector.

26. The method of claim 25, wherein said positioning a rear housing in the cavity comprises fixedly coupling the rear housing to the front end of the shell using fasteners, said positioning a front housing in the cavity comprises slidably coupling the front housing to the fasteners such that the front housing is movable relative to the rear housing.

27. The method of claim 25, wherein said positioning the flow deflector between the front housing and the rear housing comprises positioning the flow deflector such that the intake bore extends along an intake bore axis parallel to the rotation axis and the discharge bore extends along a discharge bore axis angled relative to the intake bore axis by a fluid path change angle of between 0° and 45°.

28. The method of claim 25, further comprising providing a gear coaxial with the hub and operably coupling an actuator of a driver assembly to the gear to rotate the hub.

29. The method of claim 25, wherein said positioning the flow deflector comprises positioning the flow deflector such that the flow deflector is rotatable to a shut off position in which the discharge bore is in flow communication with neither the first outlet bore nor the second outlet bore to stop flow through the directional flow control device.

30. The method of claim 25, further comprising positioning a biasing spring between the front end of the shell and the front housing to move the front housing into sealing engagement with the hub of the flow deflector.

* * * * *